(12) United States Patent
Torii et al.

(10) Patent No.: US 7,299,548 B2
(45) Date of Patent: Nov. 27, 2007

(54) METHOD OF WATERPROOF OF ELECTRIC CABLE JOINT

(75) Inventors: Chieko Torii, Shizuoka (JP); Takayuki Yamamoto, Shizuoka (JP); Masato Ozawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 28 days.

(21) Appl. No.: 11/026,155

(22) Filed: Jan. 3, 2005

(65) Prior Publication Data

US 2005/0178003 A1 Aug. 18, 2005

(30) Foreign Application Priority Data

Feb. 18, 2004 (JP) ............... 2004-041152

(51) Int. Cl.
*H01R 43/00* (2006.01)
*H05K 13/00* (2006.01)

(52) U.S. Cl. ............... 29/855; 29/858; 29/868; 29/857; 29/825; 174/74 A; 174/84 R

(58) Field of Classification Search ............ 29/854, 29/855, 857, 858, 686, 886, 825; 174/74 A, 174/74 R, 75 R, 76, 77 R, 87, 78 R, 84 R; 439/521, 879; 739/521
See application file for complete search history.

(56) References Cited

U.S. PATENT DOCUMENTS

| | | | | |
|---|---|---|---|---|
| 3,597,528 A | * | 8/1971 | Penfield et al. | 174/87 |
| 3,937,870 A | * | 2/1976 | Bumpstead et al. | 174/87 |
| 4,039,742 A | * | 8/1977 | Smith | 174/87 |
| 4,070,543 A | * | 1/1978 | Thompson et al. | 174/87 |
| 4,484,022 A | * | 11/1984 | Eilentropp | 174/87 |
| 5,589,666 A | * | 12/1996 | DeCarlo et al. | 174/87 |
| 6,359,226 B1 | * | 3/2002 | Biddell et al. | 174/74 A |
| 7,074,077 B2 | * | 7/2006 | Sakaguchi et al. | 439/521 |

FOREIGN PATENT DOCUMENTS

| | | |
|---|---|---|
| CH | 469 382 | 4/1969 |
| CH | 473 458 | 7/1969 |
| DE | 196 42 403 A1 | 4/1998 |
| JP | 8-22847 | 1/1996 |
| JP | 08-022847 A | 1/1996 |
| JP | 10-243539 | 9/1998 |
| JP | 10-243539 A | 9/1998 |

* cited by examiner

*Primary Examiner*—Minh Trinh
*Assistant Examiner*—Donghai D. Nguyen
(74) *Attorney, Agent, or Firm*—Kratz, Quintos & Hanson, LLP

(57) ABSTRACT

Sealing material is injected into a cap receiving an electric cable joint without remaining air bubbles. The cap has an opening at both ends and receives the joint, the electric cable being in the upper side and the joint being in the lower side. The sealing material is injected into the cap from the lower opening. The joint is inserted into the cap from the upper opening. Or, the joint is received in the cap, the sealing material is injected into the cap from the upper opening, and the cap position is reversed. Or, the sealing material is injected into the cap, from the upper opening, the joint is inserted into the cap, and the cap is reversed. A cap holder receives the cap such that the upper and/or lower opening of the cap is covered.

2 Claims, 4 Drawing Sheets

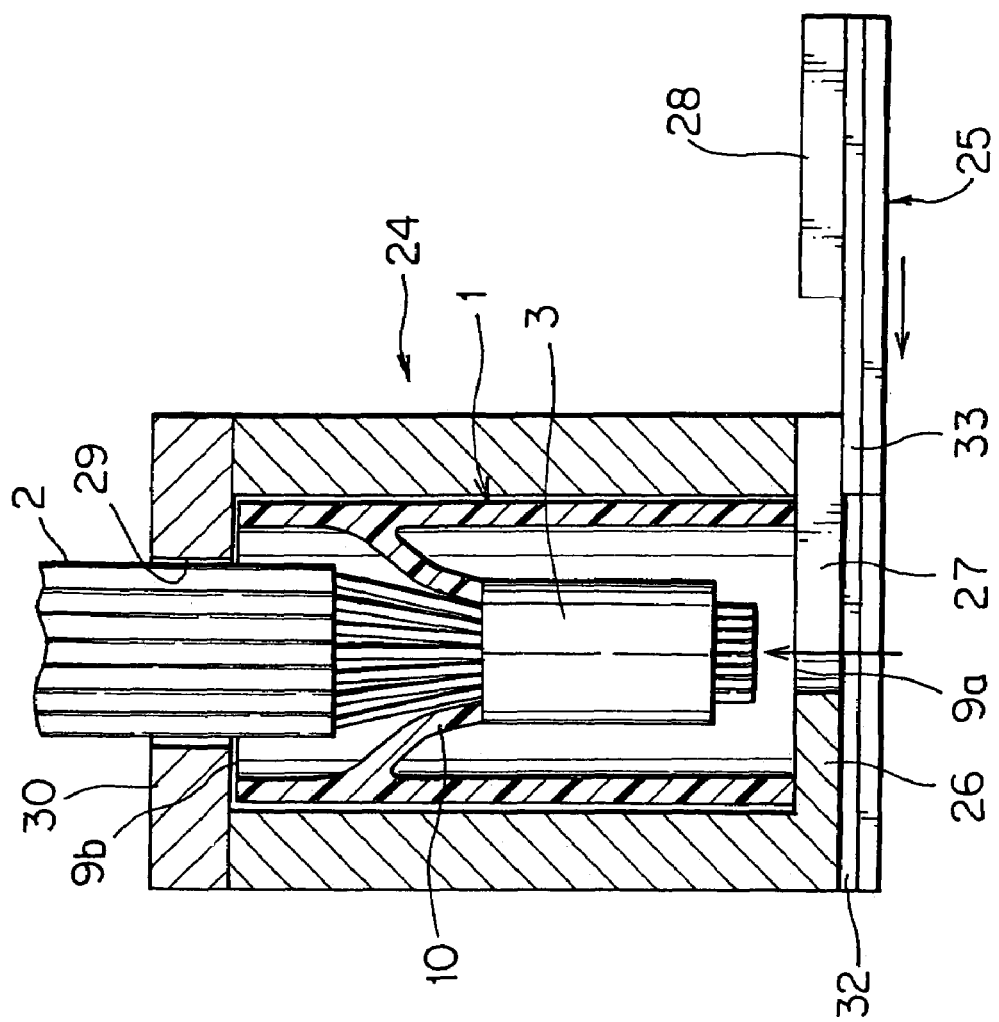
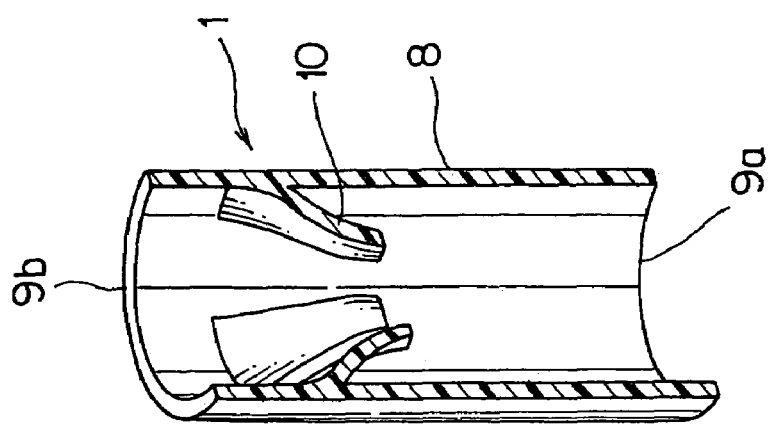

METHOD OF WATERPROOF OF ELECTRIC CABLE JOINT

BACKGROUND OF THE INVENTION

1. Field of the Invention

The present invention relates to a method of waterproof of an electric cable joint intended for waterproof and insulation of the joint, wherein the electric cable joint is received in a cap and a seal material is injected in the cap.

2. Related Art

FIGS. 7 and 8 show a conventional method of waterproof of electric cable joint described in the published patent application H10-243539 (pp. 3-4 and FIGS. 1-5) (JP, 10243539,A) referred to as Patent Document 1.

The method of waterproof of an electric cable joint constitutes the steps of injecting a sealing material 52 from above into a cap 51 made of synthetic resin standing, inserting a joint 54 of an electric cable 53 from above, fixing the electric cable 53 to an extension 55 of the cap 51 by a tape 56, and solidifying the sealing material 52 in an ambient atmosphere.

The joint 54 is formed by stripping an insulation cover of each end of a plurality of the electric cables 53 and exposing core wires (conductive portion) and connecting all together by heat press and the like.

The cap 51 has a semicircle bottom of vertical section and a cylinder of horizontal section with an opening 57 at one side. The cap 51 is made of synthetic resin such as polyvinyl chloride, polyethylene and polypropylene.

Various materials, such as urethane foam, hot melt material, various elastomer materials and the like are used as the sealing material 52. The sealing material 52 is of the character which flows at the time of injecting and solidifies when it is left. In order to solidify the sealing material 52 faster, a hardening agent is mixed to the sealing material. The sealing material 52 penetrates into the clearance of each electric cable 53 besides the joint 54 so as to prevent water from entering through the clearance among the electric cable 53 from outside.

The published patent application H10-243539 (JP, 10243539,A) describes that an annular portion is provided inside the cap 51 to hold the electric cable instead of the extension 55 of the cap 51 to hold the cable. This cap does not need a tape to hold and positions the electric cable 53 at the center of the cap.

The electric cable joint 54 is formed, for example, as one of a wiring harness of a vehicle and is used to apply a current with same electric potential to the plurality of electric cables 53 connected to electric components and auxiliary apparatus.

FIG. 9 shows a conventional cap for insulation of an electric cable joint described in the published patent application H08-22847 (JP, 822847,A) (pp. 3-4, FIG. 1).

A cap 61 is made of synthetic resin and is provided with a cap main body 62 with a bottom, and a flexible locking lance 63 disposed inside the cap main body. The flexible locking lance 63 is integrated to an opening 64 of the cap main body 62 through a thin hinge 65 and is folded back to receive the cap main body when the cap 61 is used. This structure makes a die cutting of the flexible locking lance 63 easy at the molding.

The joint 66 is prepared by the process that an insulation cover of each end of a plurality of electric cables 67 is stripped to expose a core wire and each core wire is pressure-bonded by a conductive metal sleeve.

The process of injecting a sealing material to the cap 61 is not described in the published patent application H8-22847 (JP, 822847,A). However, it is assumed that a waterproof sealing material 52 as in the document 1 is injected into the cap to obtain the waterproof of the joint 66.

However, at the conventional method of waterproof of an electric cable joint, when a sealing material is injected into a cap, air bubbles remain in the sealing material, especially in urethane foam. When the sealing material solidifies with the air bubbles remained, cracks or holes connecting the air bubbles easily occur and water penetrates into the sealing material through the cracks and holes resulting to the reduction of the waterproof and electric insulation of the electric cable joint.

If the viscosity of the sealing material is lowered to remove air bubbles quickly, the flow becomes high so that, when the joint is inserted into the cap, the sealing material spills over the cap opening and soils the cap, the curing time becomes longer and reduces the productivity.

SUMMARY OF THE INVENTION

An object of the present invention is to provide a method of waterproof of an electric cable joint wherein air bubbles are removed quickly, the waterproof and electric insulation of the electric cable joint is stably increased, and the productivity of the electric cable joint is increased.

According to a first aspect of the invention, a method of waterproof of an electric cable joint includes the steps of: receiving the electric cable joint in a cap having an opening at both ends; positioning the electric cable up and the joint down; and injecting a sealing material into the cap from the lower opening.

Thereby, the sealing material is injected into the cap from the lower opening while the joint is inserted in the cap. The sealing material is pushed upward in the cap, and the air bubbles in the sealing material are pushed upward by the flow force and are discharged outside quickly from the upper opening of the cap. Since the sealing material is first injected to the joint side and the air bubbles are pushed to the electric cable side, the air bubbles are not generated around the joint so that the waterproof and insulation of the joint are not degraded by the remaining of the air bubbles. The injection of the sealing material is effectively carried out without the interruption of the electric cable or the joint. Then, the curing time can be shortened with a use of high viscosity sealing material and the productivity of the electric cable joint is increased.

According to a second aspect of the invention, a sealing material is injected into a cap having an opening at the top and bottom, from the lower opening and the joint is inserted into the cap from the upper opening.

Thereby, the sealing material is injected quickly into the cap without the interruption of the electric cable or the joint. The sealing material is pushed upward in the cap at the injection, and the air bubbles therein are pushed upward with the flow force and are discharged quickly outside from the upper opening of the cap. The joint is inserted into the cap from the upper opening after the injection of the sealing material. Since the waterproof and insulation of the electric cable joint are stably increased and the curing time can be shortened with the use of high viscosity sealing material so that the productivity of the electric cable joint is increased with the ease of the injection of the sealing material.

According to a third aspect of the invention, an electric cable joint is received in a cap having an opening at both ends and a sealing material is injected into the cap through the upper opening and the cap is reversed up and down to leave.

Thereby, the sealing material is injected into the cap from the upper side while the electric cable joint is inserted in the cap and air bubbles gather to the lower side of the cap. The cap is reversed up and down right after the injection and the lower side (the portion of the air bubbles) before reversing becomes the upper side and the air bubbles are discharged outside quickly from the upper opening. The insertion direction of the joint into the cap may be either upward or downward. Since the waterproof and insulation of the electric cable joint are stably increased and the curing time can be shortened with the use of high viscosity sealing material so that the productivity of the electric cable joint is increased.

According to a fourth aspect of the invention, a sealing material is injected into a cap having an opening at the top and bottom from the upper opening and an electric cable joint is inserted into the cap and the cap is reversed up and down to leave.

Thereby, the sealing material is injected into the cap from the upper opening and the air bubbles in the sealing material gather much to the lower side and the cap is reversed up and down at the state so that the air bubbles are discharged outside from the upper opening. Therefore, the waterproof and insulation of the electric cable joint are stably increased and the injection of the sealing material is carried out without the interruption of the electric cable or the joint. Moreover, the curing time can be shortened with the use of high viscosity sealing material so that the productivity of the electric cable joint is increased. The joint is inserted into the cap after injecting the sealing material and the cap is reversed.

According to a fifth aspect of the invention, a sealing material is injected into a cap having an opening at both ends, from the upper opening and the cap is reversed up and down and an electric cable joint is inserted.

Thereby, the sealing material is injected into the cap from the upper side and the air bubbles in the sealing material gather much to the lower side and the cap is reversed up and down at the state so that the air bubbles are discharged outside from the upper opening. The injection of the sealing material is carried out without the interruption of the electric cable or the joint. Since the joint is inserted into the cap after reversing the cap, the air bubbles move upward smoothly without the interruption of the joint or the electric cable. Therefore, the waterproof and insulation of the electric cable joint are stably increased. Moreover, the curing time can be shortened with the use of high viscosity sealing material so that the productivity of the electric cable joint is increased.

Preferably, it is utilized that the cap holder receives the cap in which the upper and/or lower opening is covered.

Thereby, the cap is hold vertically in the cap holder so that the injection of the sealing material into the cap or the insertion of the joint is smoothly made. The lower opening of the cap (the lower side opening when the sealing material is injected or the cap is reversed) is sealed by the bottom wall or the packing of the cap holder so that the leakage of the sealing material from the lower side opening is prevented. The appearance and quality of the electric cable joint is improved. One side of the holder is provided with a injection portion of the sealing material (nozzle or a small opening) and the other side is provided with an electric cable insertion through-hole.

BRIEF DESCRIPTION OF THE DRAWINGS

FIG. 3 is a sectional perspective view showing the inside of an embodiment of a waterproof cap;

FIG. 4 is a vertical sectional view showing a method of waterproof of an electric cable joint utilizing a cap holder of other embodiment;

DETAILED DESCRIPTION OF THE PREFERRED EMBODIMENTS

Figure 2:
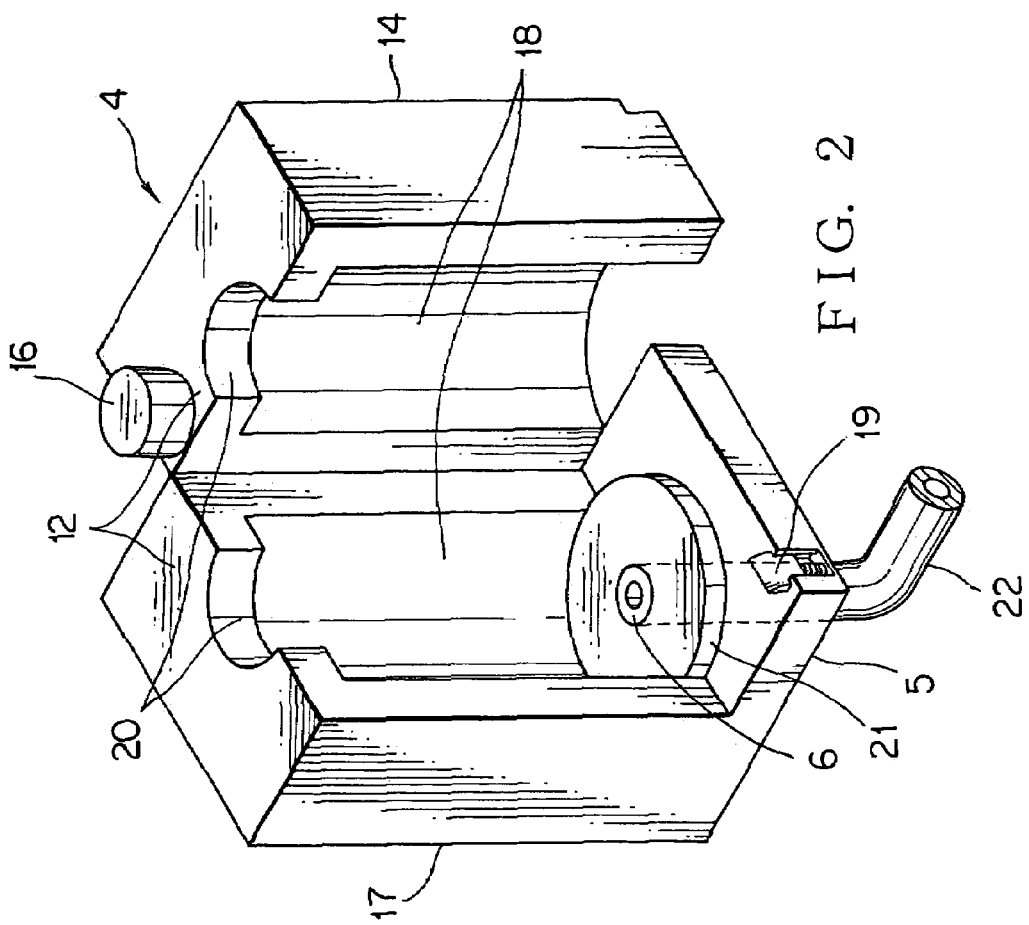
FIG. 2 is a perspective view showing an embodiment of a cap holder utilized in a method of waterproof of an electric cable joint.
Figure 1:
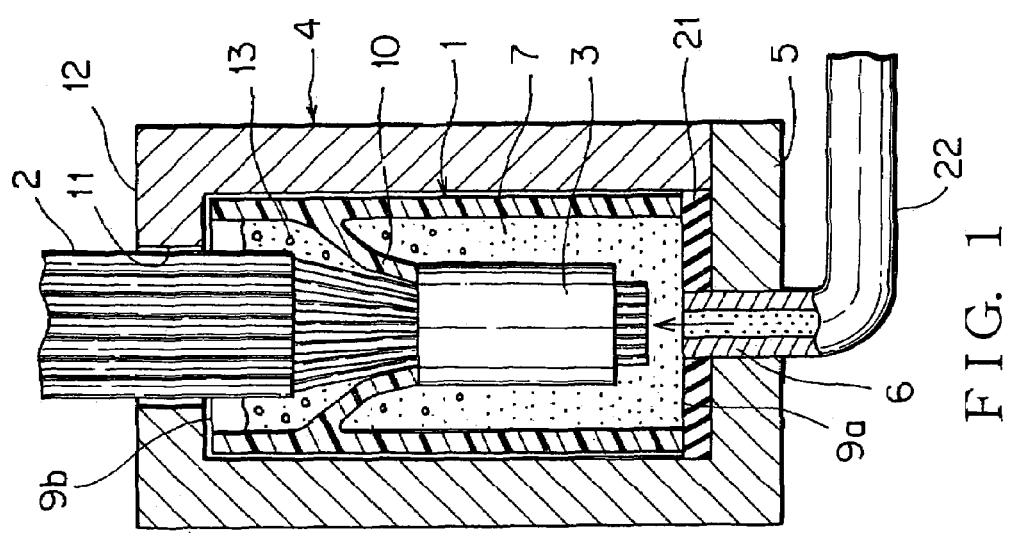
FIG. 1 is a vertical sectional view showing an embodiment of a method of waterproof of an electric cable joint according to the present invention.

FIGS. 1 and 2 show an embodiment of a method of waterproof of an electric cable joint according to the present invention.

The method of waterproof of the electric cable joint utilizes a generally cylindrical cap 1 made of synthetic resin having a vertical through-hole (a top and bottom opening 9a and 9b). The joint 3 of the electric cable 2 is inserted into the cap, keeping the electric cable 2 upward and the joint 3 downward, and the cap 1 is set inside a holder 4 and a sealing material 7 is injected by a injection nozzle 6, which penetrates a bottom wall 5 of the holder 4, into the cap upward from the lower side.

The cap 1 is provided with a cylindrical cap main body 8 and a flexible locking lance 10 which projects into a front (lower) opening 9a from the inner face of the cap main body 8 as shown in FIG. 3 (a vertical sectional view). The front opening means the opening locating to the front end side of the joint when the joint 3 is fitted.

The cap main body 8 may be provided integrally to a lid (not shown) to close the front opening 9a through a thin hinge (not shown) or may be provided with separately from the lid without the thin hinge. A locking projection may be provided perpendicularly in the inner face of the cap main body 8 in place of the flexible locking lance 10. The electric cable holder such as the annular portion in the conventional example (Patent Document 1) may be used. If the upper opening (FIG. 1) of the holder 4 combines with the electric cable holder, the electric cable holder inside the cap can be removed. When the contact between a through-hole 11 and the electric cable 2 is good, a small through-hole to remove air bubbles may be provided on a upper wall 12 of the holder 4.

In any case, it is characterized that the sealing material 7 is injected from the lower side while keeping the joint 3 downward in the cap. The joint 3 is inserted from the upper opening 9b of the cap 1 in the present invention.

By injecting the sealing material 7 from the lower side of the cap 1, the sealing material 7 is injected effectively and assuredly in the cap in the order of the joint 3 and the electric cable 2. Moreover, as the sealing material 7 is pushed from bottom to top, air bubbles 13 lighter than the sealing material 7 is pushed upward as shown in FIG. 1 and are discharged into air from the upper face of the sealing material 7.

Since the sealing material 7 is injected into the cap without the disturbance of the electric cable 2, the injection speed is high and the injection time is short and the joint 3 is assuredly covered (embedded) with the sealing material 7 without the air bubbles and is protected. In the case of that the sealing material 7 is injected from the upper side, that is, the electric cable side, the electric cable 2 disturbs the injection work of the sealing material 7 and the sealing material 7 reaches hardly to the joint 3 of the lower side and there appears the fear of generation of large air bubbles at the joint 3.

FIG. 2 shows an example of the cap holder 4. The cap holder 4 is divided into two parts, a front portion (cover) 14 being supported by a horizontal bottom wall 5 and being opened and closed by a hinge axis 16, the front portion 14 and a back portion 17 having a receiving groove 18 with a horizontal section of semicircle, the front portion 14 being closed and locked by a lock 19, and the receiving groove 18 of the back and front portion being combined to form the cap receiving chamber. An insertion groove 20 of the electric cable following to the receiving chamber is provided on the upper wall 12 of the front and back portion 14 and 17 and each insertion groove 20 is combined to form the circular through-hole 11 of the electric cable.

A packing 21 protecting the leakage of the sealing material is provided in the bottom of the cap receiving chamber 18 and a nozzle 6 for injecting the sealing material is positioned at the center of the packing 21 and the nozzle 6 follows to a soft or hard pipe 22. The sealing material 7 is injected upward from the lower side of the cap 1 from the pipe 22 and the nozzle 6. After the sealing material 7 in the cap solidifies with untouched, or heating or cooling, the front portion 14 is opened and the cap 1 is pulled out with the joint 3 as a cap assembly (a waterproofing end of the electric cable).

In addition, when urethane foam is used as the sealing material 7, it is desirable to provide a packing for leak prevention also in the upper wall 12 of the holder 4 corresponding to the expansion of the seal material 7 by foaming. In this case, it is desirable to provide a certain amount of clearance so that air bubbles are discharged to the open air from the electric cable through-hole 11. Various kinds of materials described in the conventional examples can be used for the sealing material 7 and the cap 1.

In the embodiments of FIGS. 1 and 2, the holder 4 is reversed up and down and the nozzle is positioned in the upper side and the electric cable 2 is guided out downward from the holder 4 and the sealing material 7 is injected into the cap from the upper side. After injecting the sealing material 7, the holder 4 is immediately reversed up and down to set the nozzle 6 or the joint 3 to the lower position and to set the electric cable 2 to the upper position as the embodiment of FIG. 1, and is left to remove the air bubbles 13 easily.

In this case, the sealing material 7 is injected from the joint side to the electric cable side same as the embodiment of FIG. 1 and the air bubbles 13 are pushed out to the flowing direction (injected direction) of the sealing material 7 and remains in the electric cable side. The holder 4 and the cap assembly are immediately reversed up and down, the joint 3 being down and the electric cable 2 being up, the air bubbles 13 centered in the electric cable side are discharged outside in a short time.

The holder 4 is not limited to be divided as in FIG. 2. For example, the upper wall 12 may be formed separately into two parts. Then the cap 1 is inserted into the receiving chamber 18 and the upper wall 12 covers the upper opening 11 of the receiving chamber 18.

It is also appreciated that the cap 1 is set inside the holder in FIG. 1 and the sealing material 7 is injected into the cap from the lower side and then the electric cable joint 3 is inserted into the cap from the upper side. It is desirable that the diameter of the joint 3 is smaller than that of the plurality of electric cables 2 and the electric cable through-hole 11 is reduced so as to prevent the electric cable 2 and the joint 3 from falling down.

It is also appreciated that the cap 1 is only set inside the holder which is reversed up and down from FIG. 1 and the sealing material 7 is injected into the cap from the upper side and then the holder is immediately reversed up and down and the air bubble is discharged to the upper side and the joint 3 is inserted into the cap from the upper side.

The joint 3 may be formed with a pressure-bond sleeve of conductive metal or a hot-welding of core wires of the electric cable, or may be formed from a cylindrical conductive metal sleeve which is rotated and compressed (forged) uniformly over the circumference by swaging as the conventional manner.

The swaging can provide a compact joint with a small diameter without projection at the circumference and can make the cap size (inner and outer diameter) compact. Since the joint does not have projection (barrier) in the outer circumference, it is easily made the joint to insert in or engage with the cap 1.

Figure 5:
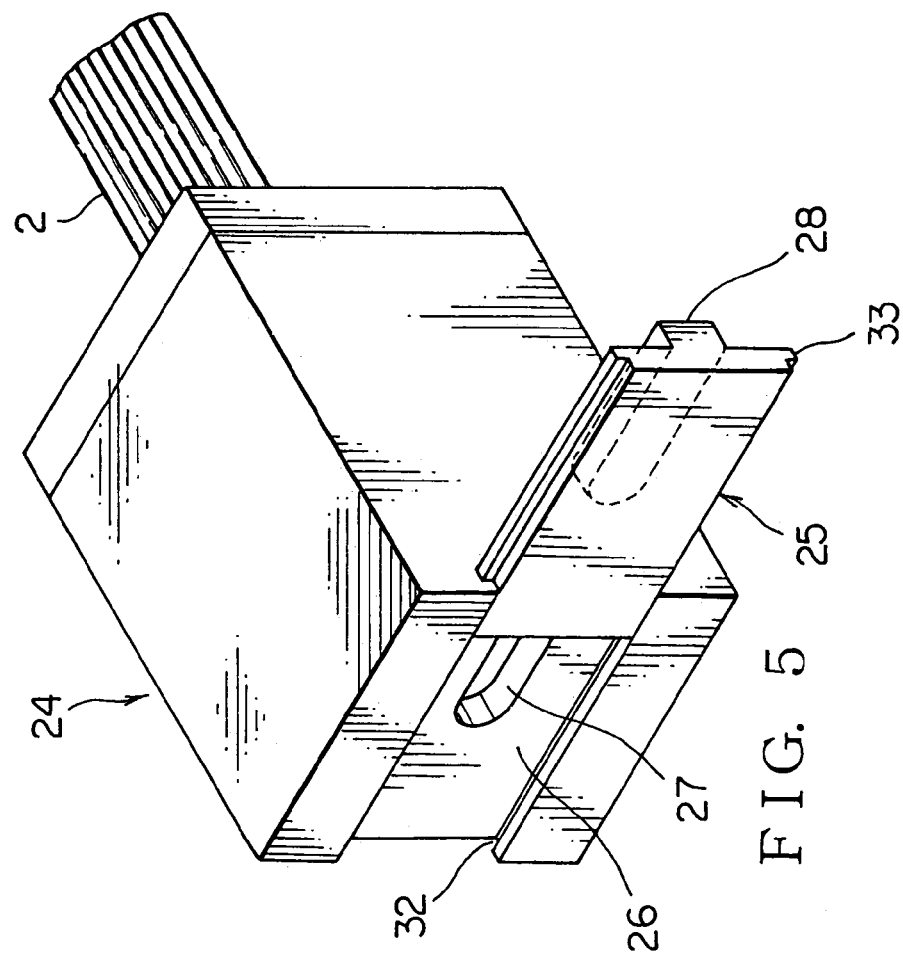
FIG. 5 is a perspective view showing a cap holder.
Figure 9:
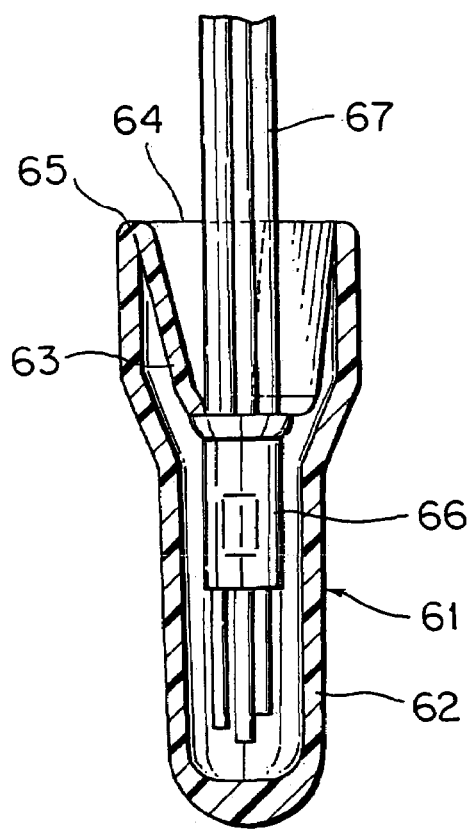
FIG. 9 is a vertical sectional view showing that an electric cable joint is locked to a conventional insulation cap.
Figure 7:
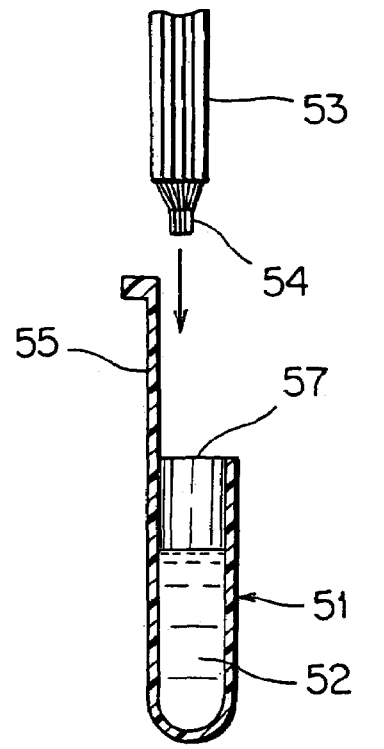
FIG. 7 is a vertical sectional view showing a process of an embodiment of a method of waterproof of a conventional electric cable joint.
Figure 8:
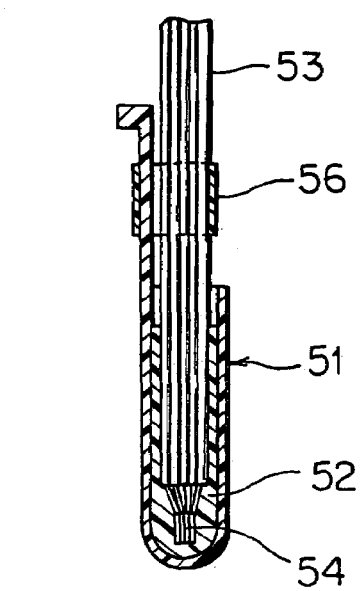
FIG. 8 is a vertical sectional view showing a next process of a method of waterproof of a conventional electric cable joint.

FIGS. 4 and 5 show other embodiments of a cap holder. The cap holder 24 is provided at the bottom with a sliding plate 25 which is slidable in the horizontal direction and the sliding plate 25 covers an injection inlet 27 (under opening) of a sealing material of a bottom wall 26.

Preferably, the sliding plate 25 is provided with a rail 33 which engages to slide on a guiding groove 32 at the bottom side, and a projection 28 which engages to slide in the slit-like injection inlet 27 of the sealing material so as to cover completely the injection inlet 27.

It is not necessary to open large the injection inlet 27 of sealing material by the sliding plate 25 as shown in FIGS. 4 and 5. The injection inlet 27 is opened to the minimal extent that the injection nozzle (not shown) can enter and the sealing material 7 is injected from the lower side same as the examples of FIGS. 1 and 2 and the sliding plate 25 is immediately closed to minimize the leakage of the sealing material.

When the injection inlet of a circular through-hole is formed at the bottom wall 26 instead of the slit-like shape, a rotatable plate (not shown) is provided with a circular projection to cover the injection inlet of the circular through-hole instead of the sliding plate 25.

The injection direction of the sealing material 7 is same as the embodiments of FIGS. 1 and 2. The cap 1 is set in the holder, that is, the joint 3 being under and the electric cable 3 being upper, and a nozzle is inserted into the lower opening 27 of the holder 24 and the sealing material 7 is injected upward the cap. Thereby, the air bubbles 13 in the sealing material are discharged outside quickly as the same operation of the examples.

The holder 24 of FIGS. 4 and 5 may be divided into front and back parts as the example, or an upper wall 30 having an electric cable insertion through-hole (upper opening) 29 may be formed separately in a cover to close the upper wall 30 after inserting the electric cable. It is also appreciated that the holder 24 is reversed up and down from FIG. 4, and after the sealing material 7 is injected from above the holder is reversed up and down to the state of FIG. 4. In this case, the joint 3 of the electric cable 2 may be inserted into the cap beforehand or after the injection of the sealing material. These are the alterations of the examples (FIGS. 1 and 2).

Figure 6:
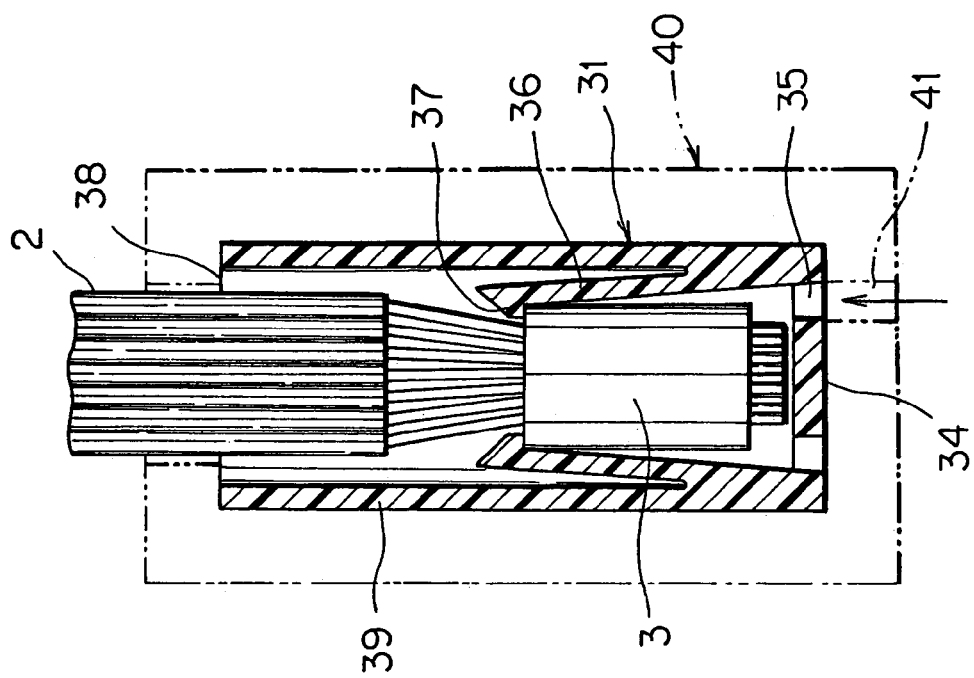
FIG. 6 is a vertical sectional view showing a method of waterproof of an electric cable joint utilizing a waterproof cap of other embodiment.

Various kinds of materials and shapes are selected and adapted to the cap 1, the joint 3 and the sealing material 7. The cap 1 of FIG. 3 is only an example and anything as far as having an opening 9a and 9b at the top and bottom (regardless of having a locking means 10 and the like) is possible to use. For example, as shown in FIG. 6, a cap 31 may have a wall 34 at the cap's front end in the transverse direction and a small opening 35 to both sides of the wall 34. The opening 35 is a die-cut hole when a claw portion 37 at the tip of a flexible locking lance 36 is molded. A resin material can be injected upward from the small opening 35. The size of the upper opening 38 is the same as the inner diameter of the cap main body 39.

In FIG. 6, numeral 40 is a cap holder and 41 is a insertion hole of a nozzle to inject a sealing material. The insertion hole 41 may be covered with the sliding plate 25 as in FIG. 5 or the nozzle 6 may be inserted in the hole 41 to be fixed. When the nozzle 6 is not fixed, it is preferable to move the nozzle vertically by a driving means such as air cylinder and the like.

It is also possible that the cap 31 and the holder 40 of FIG. 6 are reversed up and down and a sealing material 7 is injected from above and the holder 40 is immediately reversed up and down as in FIG. 6 to discharge air bubbles. The joint 3 of the electric cable 2 may be inserted into the cap 31 before or after injecting the sealing material.

In each embodiment above, the electric cable is guided out upward the cap and the sealing material is injected into the cap from the under side (the joint side). For example, in FIG. 1, it is also possible that the injection nozzle 6 of the bottom wall of the holder 4 is eliminated, the sealing material 7 is injected downward the cap 1 from the electric cable insertion through-hole 20 of the upper wall 12, at this moment the air bubbles concentrates downward, and the holder 4 is immediately reversed up and down to discharge the air bubbles from the opening 9 of the joint side of the cap 1. However, there is a problem that the electric cable 2 disturbs the injection of the sealing material 7.

In each embodiment above, it is also possible that the sealing material 7 is injected into the cap 1, 31 from the upper opening 9b, 38 before inserting the joint 3, both cap and holder are reversed up and down, and the joint 3 of the electric cable 2 is inserted into the cap from above (the opening 9a, 35 is under side before reversing).

Although the insertion of the joint 3 is easily carried out from the upper side, it is not impossible to insert the joint 3 from the under side if the packing of the bottom wall of the holder 4, 40 is contrived (for example, the joint 3 is inserted into the packing through-hole intimately, that is, the packing through-hole is forced to close in a reduced diameter).

What is claimed is:

1. A method of waterproofing an electric cable joint comprising the steps of:

receiving the electric cable having a preformed joint into a cap having a single insertion opening at the top and an injection opening in the bottom; positioning the electric cable upside and the joint lower side;

positioning the cap containing the electric cable and preformed joint in a cap holder that has an injection hole disposed in a bottom wall thereof and a through-hole for the electric cable in a top wall thereof: and injecting a sealing material directly into the cap through the injection opening of the cap by the injection nozzle through the injection hole, to encapsulate the electric cable joint in said sealing material, and removing the electric cable joint, so encapsulated in the cap, from the cap holder.

2. The method of waterproofing the electric cable joint according to claim 1, wherein the cap is received in the cap holder in the state that the upper and/or lower opening of the cap is covered.

* * * * *